(12) United States Patent
He et al.

(10) Patent No.: US 11,756,352 B2
(45) Date of Patent: Sep. 12, 2023

(54) PILOT PROTECTION METHOD, DEVICE AND STORAGE MEDIUM

(71) Applicant: Guangdong University of Technology, Guangzhou (CN)

(72) Inventors: Ruiwen He, Guangzhou (CN); Ruisi Li, Guangzhou (CN); Yuan Jin, Guangzhou (CN); Yiyu Lin, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/052,576

(22) Filed: Nov. 4, 2022

(65) Prior Publication Data
US 2023/0148329 A1 May 11, 2023

(30) Foreign Application Priority Data
Nov. 9, 2021 (CN) .......................... 202111322840.6

(51) Int. Cl.
*G07C 5/08* (2006.01)
*G06F 18/25* (2023.01)
*G06F 123/02* (2023.01)

(52) U.S. Cl.
CPC ......... *G07C 5/0816* (2013.01); *G06F 18/251* (2023.01); *G07C 5/0808* (2013.01); *G06F 2123/02* (2023.01)

(58) Field of Classification Search
CPC ... G07C 5/0816; G07C 5/0808; G06F 18/251; G06F 2123/02
See application file for complete search history.

(56) References Cited

U.S. PATENT DOCUMENTS

| 6,194,877 B1 * | 2/2001 | Judge | H02J 7/14 |
| | | | 320/162 |
| 2012/0271507 A1 * | 10/2012 | Umesaka | G07C 5/0816 |
| | | | 701/33.2 |

(Continued)

FOREIGN PATENT DOCUMENTS

| CN | 2017033526 A | 2/2017 |
| CN | 110086154 A | 8/2019 |
| CN | 13297786 A | 8/2021 |

OTHER PUBLICATIONS

The search report of CN application No. 2021113228406 dated May 19, 2022.

(Continued)

*Primary Examiner* — Mussa A Shaawat
(74) *Attorney, Agent, or Firm* — Andrew C. Cheng

(57) ABSTRACT

A pilot protection method includes: obtaining time-domain signals data of target element at a preset sampling frequency; fusing time-domain signals data of multiple first sampling periods to obtain first time-domain signals combination data; based on a machine learning model, determining whether a fault occurs in target element according to the first time-domain signals combination data; when it is determined that a fault occurs in target element according to the first time-domain signals combination data, based on the machine learning model, determining whether a fault occurs in target element in the second sampling period according to the second time-domain signals combination data. The second sampling period is the sampling period after determining a fault occurs; when it is determined that the same type of fault occurs in target element in multiple consecutive second sampling periods, the pilot protection system is controlled to perform the protection action on the target element.

11 Claims, 7 Drawing Sheets

(56) References Cited

U.S. PATENT DOCUMENTS

2017/0031329 A1* 2/2017 Inagaki .................... G06N 3/08
2019/0236865 A1* 8/2019 Mercep ............. B60W 50/0225
2019/0361065 A1* 11/2019 He ....................... G01R 31/086
2020/0023891 A1* 1/2020 Lin ...................... B62D 5/0484

OTHER PUBLICATIONS

The office action of CN application No. 2021113228406 dated May 19, 2022.

* cited by examiner

PILOT PROTECTION METHOD, DEVICE AND STORAGE MEDIUM

FIELD

The present application relates to the technical field of power system relay protection, and particularly relates to a pilot protection method, device and storage medium.

BACKGROUND

With a ubiquitous access to information technology, information sharing has become a prominent feature of smart grid. The time-domain signals of electrical quantities in smart substation and smart grid can be collected and adopted directly for data fusion to depict physical phenomena.

Existing pilot protection methods, such as proportional braking differential protection, have been applied in engineering for many years, and have good application effects in traditional power grids. However, they need to extract frequency domain components, and also depend on setting values and complex criteria. In the future smart grid, considering the proliferation of large-scale intermittent energy resources and power electronic equipment, power system operations encounter various uncertainties and present the aliasing of various time constant dynamic processes, resulting in great variation in system fault characteristics, which will make it difficult for the protection functions in the existing design mode to have sufficient coping capability.

SUMMARY

Accordingly, the present application provides a pilot protection method, device and storage medium, which can realize the fault identification of power system elements by using machine learning model, and can remove the faulty elements timely, accurately and reliably, so as to significantly improve the protection performance of smart grid.

In a first aspect, an embodiment of the present application provides a pilot protection method, comprising:

Obtaining time-domain signals data of a target element at a preset sampling frequency;

Based on preset data fusion rules, fusing time-domain signals data of multiple first sampling periods to obtain first time-domain signals combination data.

Based on a trained machine learning model, determining whether a fault occurs in the target element and a fault type according to the first time-domain signals combination data;

When it is determined that a fault occurs in the target element according to the first time-domain signals combination data, based on the trained machine learning model, determining whether a fault occurs in the target element in the second sampling period and the fault type according to the second time-domain signals combination data, and the second sampling period is the sampling period after determining that a fault occurs. The second time-domain signals combination data is obtained by fusing the time-domain signals data of the first sampling periods and at least one of the second sampling periods, or by fusing the time-domain signals data of multiple second sampling periods;

When it is determined that the same type of fault occurs in the target element in multiple consecutive second sampling periods, the pilot protection system is controlled to perform the protection action on the target element according to the fault type.

In a second aspect, an embodiment of the present application provides a pilot protection device, comprising a memory and a processor;

The memory is used to store computer programs;

The processor is used to execute the computer programs and performs the steps of the above pilot protection method while executing the computer programs.

In a third aspect, an embodiment of the present application provides a computer-readable storage medium, which is used to store the computer programs, and the processor performs the steps of the above method while executing the computer programs.

According to the above aspects, an embodiment of the present application provides a pilot protection method, device and storage medium. Time-domain signals data of a target element is obtained at a preset sampling frequency; based on preset data fusion rules, the time-domain signals data of multiple first sampling periods are fused to obtain first time-domain signals combination data; based on a trained machine learning model, determining whether a fault occurs in the target element and a fault type according to the first time-domain signals combination data; when it is determined that a fault occurs in the target element, based on the trained machine learning model, determining whether a fault occurs in the target element in the second sampling period and the fault type according to the second time-domain signals combination data, and the second sampling period is the sampling period after determining that a fault occurs; when it is determined that the same type of fault occurs in the target element in multiple consecutive second sampling periods, the pilot protection system is controlled to perform the protection action on the target element according to the fault type. The machine learning model can be used to realize the fault identification of power system elements to remove the faulty elements promptly, accurately and reliably, so as to significantly improve the protection performance of smart grid.

It should be understood that the general description above and the detailed description that follows are exemplary and explanatory only and do not limit the disclosure of the embodiments of the present application.

BRIEF DESCRIPTION OF THE DRAWINGS

To more clearly explain the technical solutions of the embodiments of the present application, drawings required for the description of the embodiments of the present application will be briefly introduced below. Obviously, the drawings in the following description are merely for some embodiments of the present application, and those of ordinary skill in the art can obtain other drawings according to the following ones without creative efforts.

DESCRIPTION OF THE EMBODIMENTS

The technical solutions of the embodiments of the present application will be clearly and completely described below in conjunction with the drawings of the embodiments. Obviously, the embodiments in the following description are merely part of but not all possible embodiments of the present application. All other embodiments obtained by those of ordinary skill in the art on the basis of the embodiments described herein without creative efforts should also fall within the protection scope of the present application.

The flow chart shown in the attached drawings is illustrative only and does not have to include all the contents and operations/steps, nor do they have to be executed in the order described. For example, some operations/steps can also be broken down, combined, or partially merged, so the actual order of execution may change depending on the situation.

According to the attached drawings, some implementations of the present application are described in detail. The following embodiments and the characteristics in the embodiments may be combined without conflict.

Figure 1:
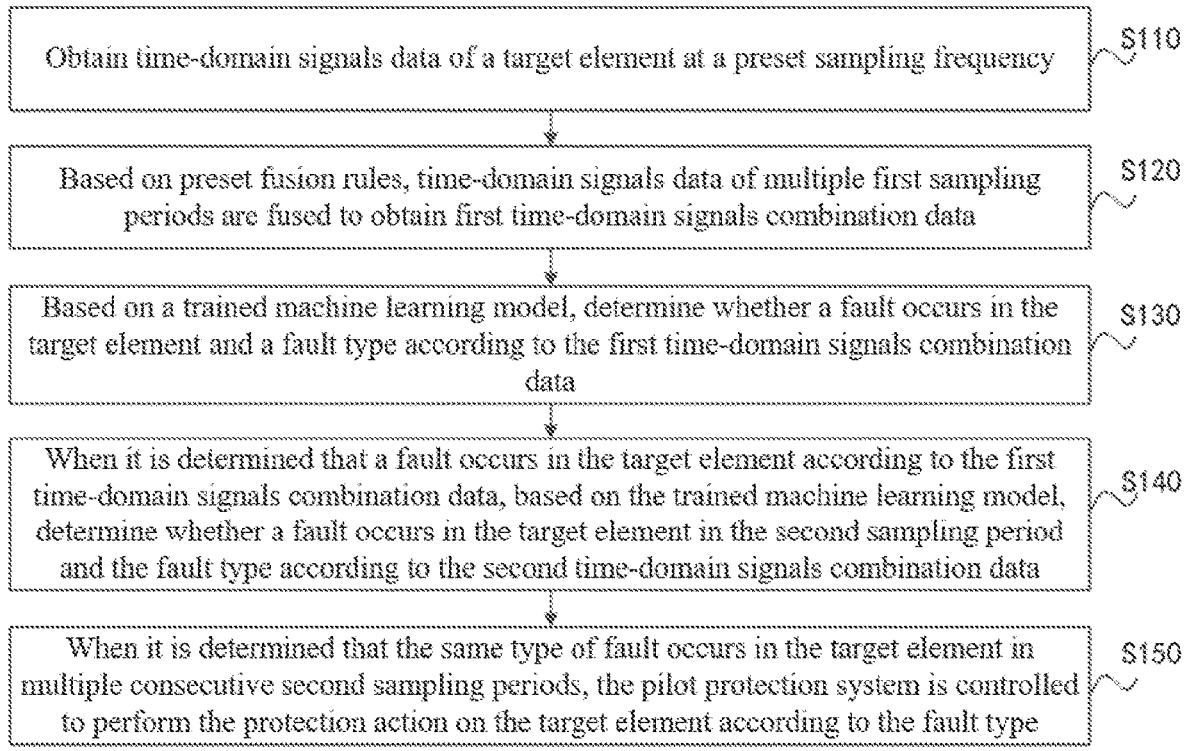
FIG. 1 is a flow chart of a pilot protection method according to an embodiment of the present application.

Referring to FIG. 1 for a flow chart of a pilot protection method according to an embodiment of the present application. The performance evaluation method can be applied in the pilot protection device to identify the fault of the target element based on the machine learning model and perform the protection action on the target element.

In some implementations, pilot protection devices can provide pilot protection for power system elements (e.g., transmission lines, transformers, buses, generators, distribution lines). In other words, power system elements such as transmission lines, transformers, and buses can be used as protected elements or as target elements of the pilot protection. Also not limited to this, for example, the pilot protection device can also be used to provide other types of protection for power system elements. This is not limited in this embodiment of the present application.

Figure 2:
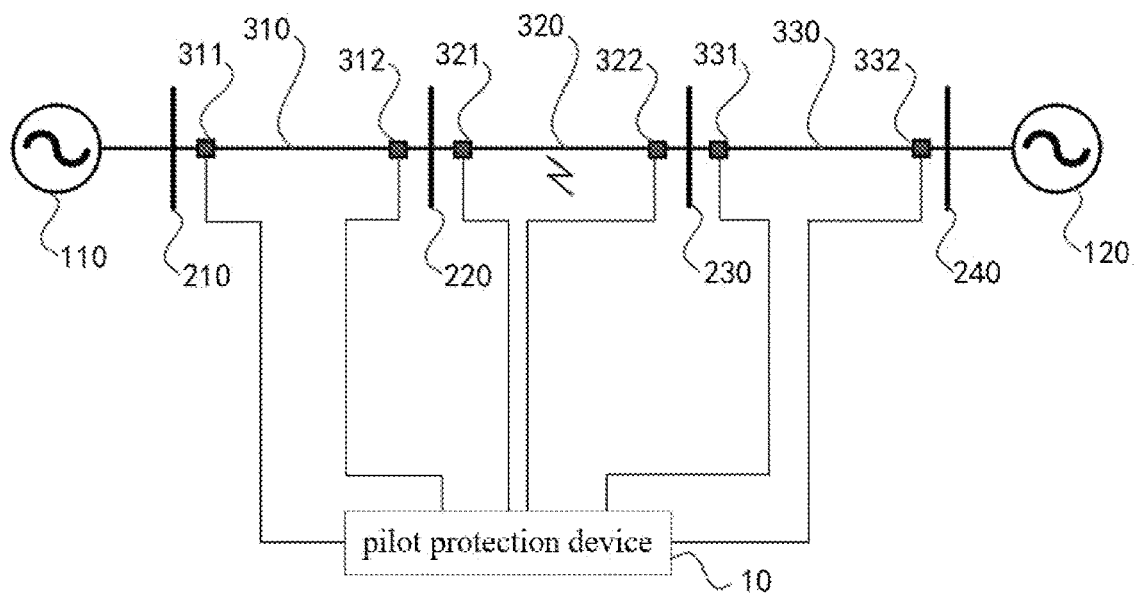
FIG. 2 is a schematic diagram of the power system model in one implementation of the present application.
Figure 3A:
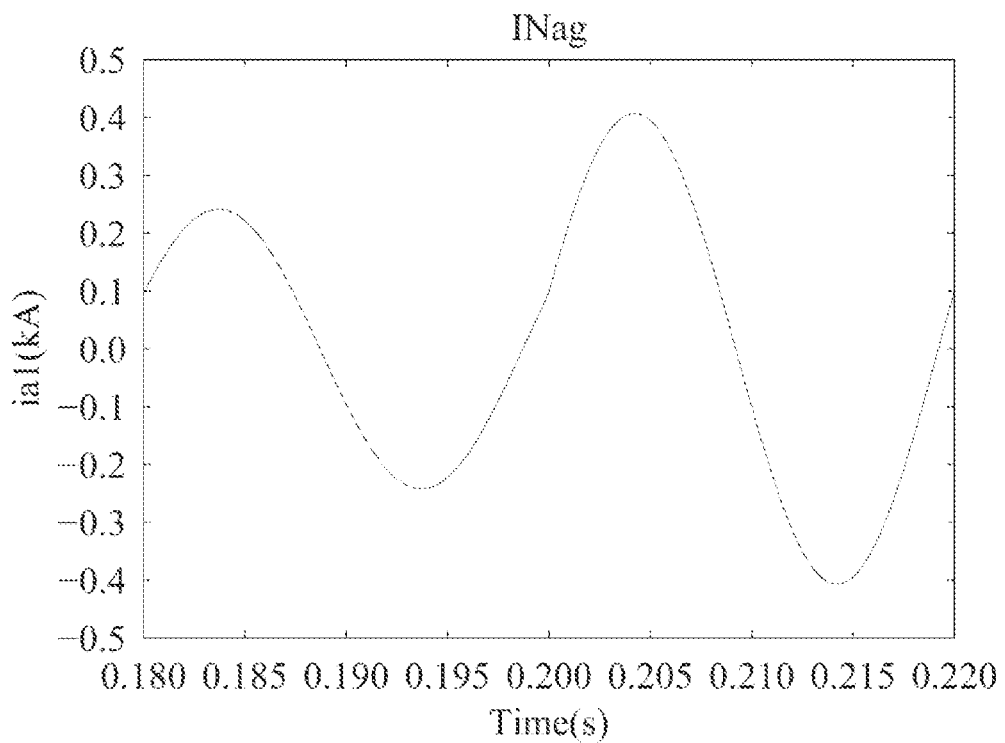
FIG. 3(a) to 3(f) are schematic diagrams of the current waveform at both terminals of the target element when an internal fault occurs in the target element in one implementation of the present application.
Figure 3B:
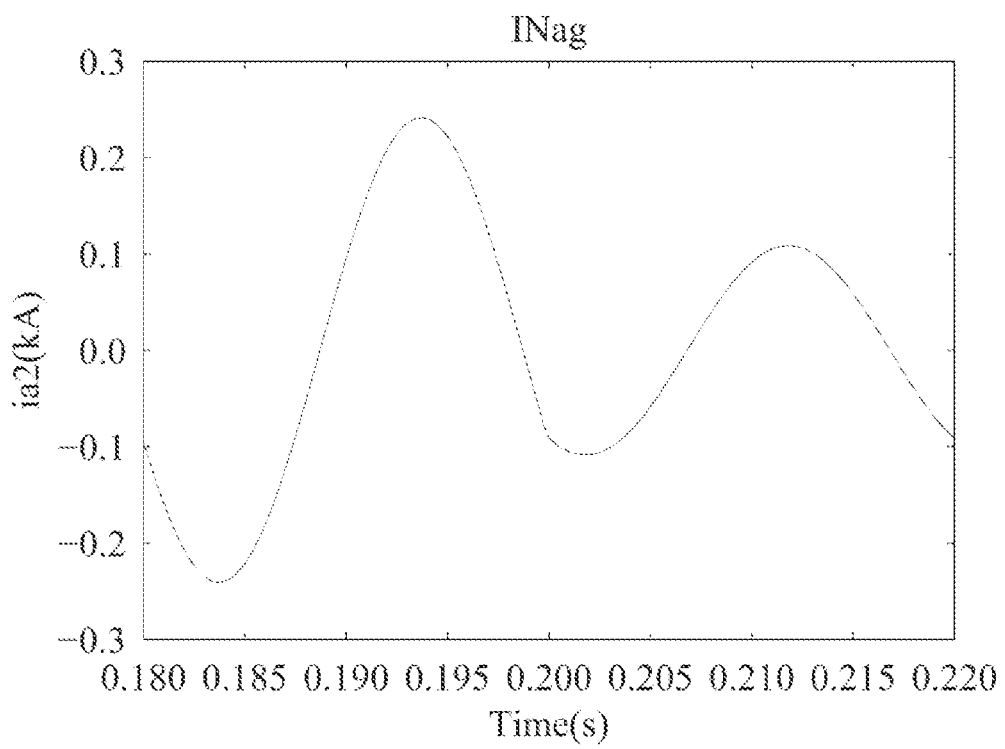
Figure 3C:
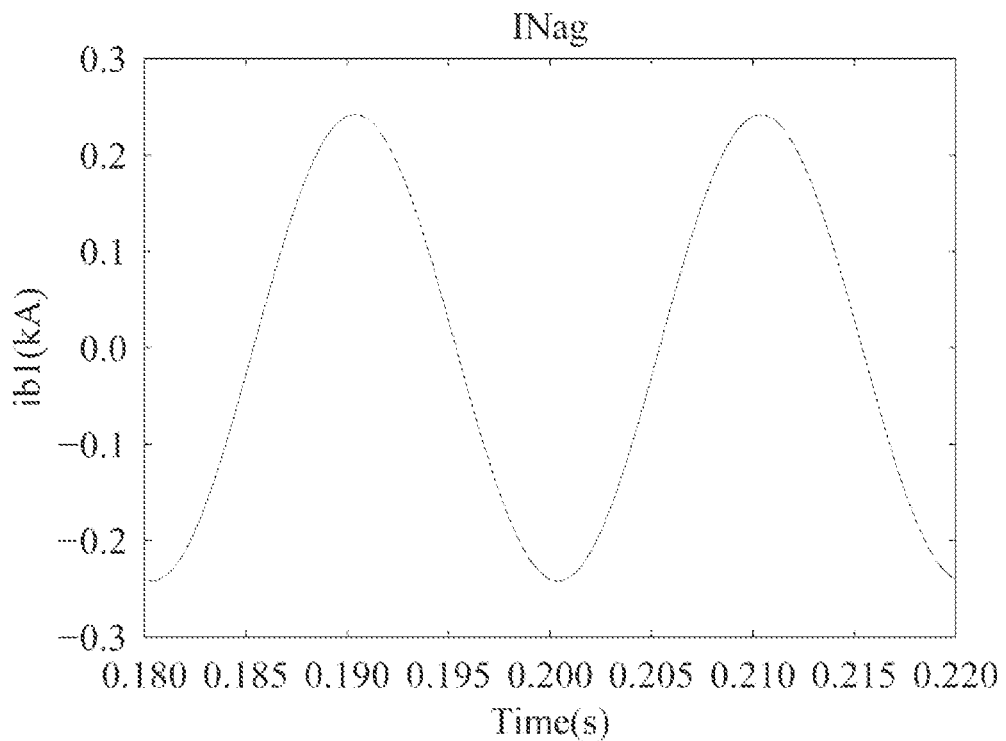
Figure 3D:
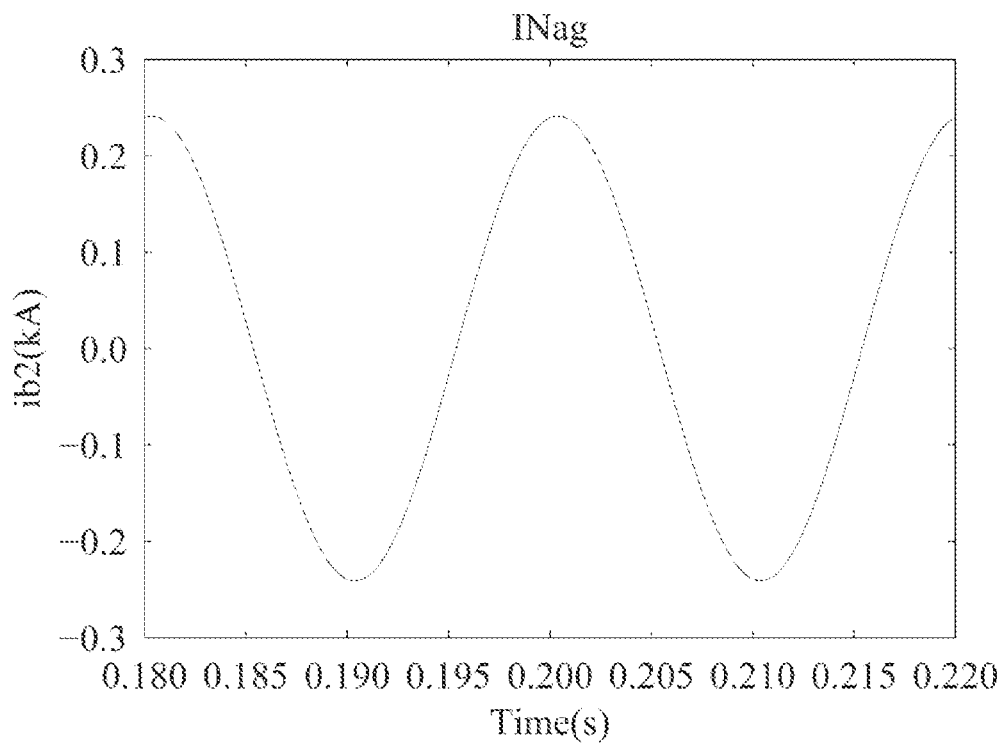
Figure 3E:
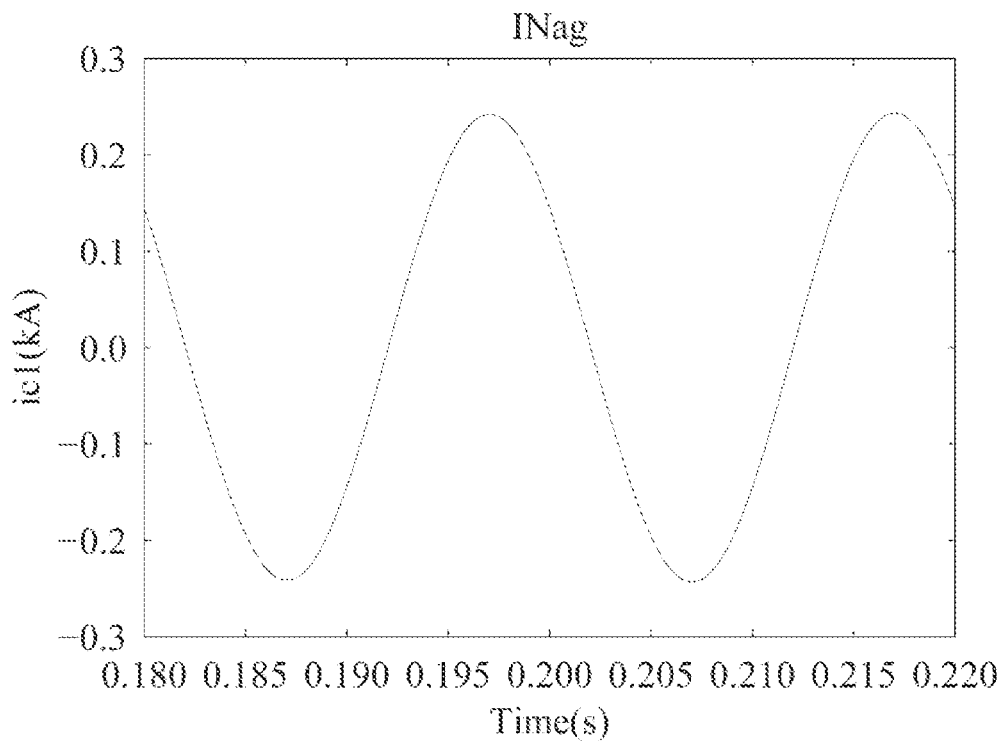
Figure 3F:
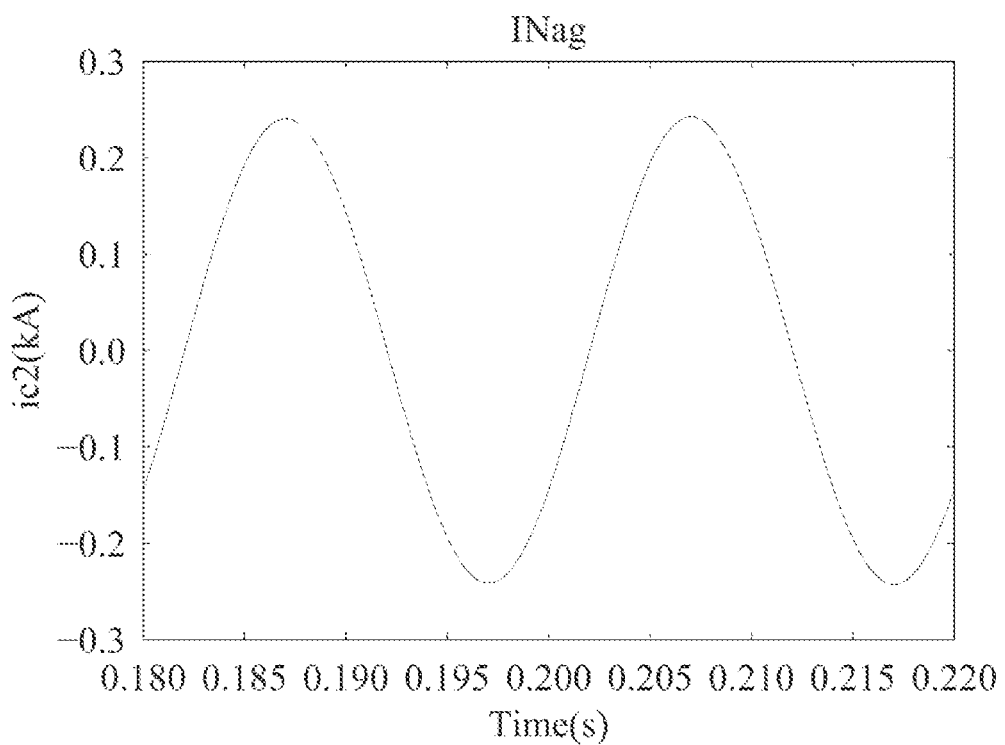

In some implementations, referring to FIG. 2 for a power system model, for example, a three-phase two-terminal model includes the first source 110 and second source 120, the first bus 210, second bus 220, third bus 230, fourth bus 240 between the first source 110 and the second source 120. And the first transmission line 310 between the first bus 210 and the second bus 220, the second transmission line 320 between the second bus 220 and the third bus 230, the third transmission line 330 between the third bus 230 and the fourth bus 240. For example, in the power system model shown in FIG. 2, the system frequency is 50 Hz, the rated voltage is 220 kV, the power supply capacity of the first source 110 and the second power source 120 is 100 MVA, and the source impedance of the first source 110 and the second power source 120 is $Zs=9.19+j74.76\Omega$. The length of the first transmission line 310 and the second transmission line 320 is 200 km, and the length of the third transmission line 330 is 350 km. The positive-sequence impedance of the first transmission line 310 and the second transmission line 320 is $Z1=5.38+j84.55\Omega$, and the zero-sequence impedance of the first transmission line 310 and the second transmission line 320 is $Z0=64.82+j209.53\Omega$. The positive-sequence impedance of the third transmission line 330 is $Z1=9.415+j147.96\Omega$, and the zero-sequence impedance of the third transmission line 330 is $Z0=113.435+j366.68\Omega$. In some other implementations, the power system model may differ from FIG. 2, such as the number of transmission lines, buses, or may also include transformer.

Referring to FIG. 2, relay protection devices are set at terminals on both sides of the first transmission line 310, second transmission line 320 and third transmission line 330. For example, relay protection devices 311 and 312 are set at terminals on both sides of the first transmission line 310, relay protection devices 321 and 322 are set at terminals on both sides of the second transmission line 320, and relay protection devices 331 and 332 are set at the terminals on both sides of the third transmission line 330. Referring to FIG. 2, each relay protection device can communicate with the pilot protection device 10, like communicating with the pilot protection device 10 through the switch and router. Pilot protection device 10 can obtain the target element, such as the electric energy parameters (e.g., at least one of the current and voltage) of both terminals of the second transmission line 320, and determine whether a fault occurs in the target element and the fault type according to the electric energy parameters of both terminals of the second transmission line 320. Then according to the determination result, the relay protection device of at least one terminal of the second transmission line 320 can be controlled to perform action when meeting the preset condition, for example, removing the fault in the second transmission line 320 when the second transmission line 320 is faulty.

As shown in FIG. 1, the performance evaluation method in this embodiment of the present application includes step S110 to step S150.

Step S110: Obtain time-domain signals data of a target element at a preset sampling frequency.

Exemplarily, time-domain signals data includes at least three-phase current time-domain signal. When the system frequency of the power system model is 50 Hz, the preset sampling frequency can be 10 kHz, that is, 200 data points can be sampled from each channel in each fundamental frequency period (or called cycle), then 1200 data points can be obtained from 6 channels at both terminals of three phases of the target element. For example, when the target element is the second transmission line 320, obtain the three-phase current time-domain signal of relay protection devices 321 and 322 at both terminals of the second transmission line 320 at the preset sampling frequency.

Exemplarily, time-domain signals data can also include three-phase voltage time-domain signal, and/or additional signals derived from mathematical operations on voltage and current (e.g., fault component, zero-axis component, etc.), also it is not limited to this. For example, the time-domain signals data can also include the three-phase current fault component d, (i.e., the difference between the current in the present sampling period and in the previous sampling period). In some other implementations, the time-domain signals data can include the three-phase voltage time-domain signal but not include the three-phase current time-domain signal.

Step S120: Based on preset fusion rules, time-domain signals data of multiple first sampling periods are fused to obtain first time-domain signals combination data.

Exemplarily, the time-domain signals data of the target element obtained in the setting time can be fused into a time-domain signals combination data or called time-domain combined signals. For example, the setting time can be ¼ cycle, ½ cycle or 1 cycle, etc. When the setting time is ½ cycle, the time-domain signals data of multiple first sampling periods includes 100 data points sampled in each channel, then the three-phase current at one terminal of the target element and the three-phase current at the other terminal, namely $i_{a1}$, $i_{b1}$, $i_{c1}$, $i_{a2}$, $i_{b2}$ and $i_{c2}$, have a total of six channels with 600 data points, marked as 600 dimensions.

Exemplarily, data points of multiple channels obtained at the same time (i.e., the same sampling period) can be organized in a preset format to obtain a time-domain combined signals point. For example, data points of multiple channels obtained in the same sampling period are stored as one-dimensional vector or two-dimensional matrix in the preset order to obtain a time-domain combined signals point.

Exemplarily, when the time-domain signals data obtained at each sampling period includes three-phase current at one terminal of the target element and three-phase current at the other terminal, the preset format of the time-domain combined signals points can be expressed as $i_{a1}$-$i_{b1}$-$i_{c1}$-$i_{a2}$-$i_{b2}$-$i_{c2}$.

Exemplarily, based on the preset fusion rules, the time-domain signals data of multiple sampling periods are fused to obtain the time-domain signals combination data, including: organizing the time-domain signals data obtained in the present sampling period in the preset format to obtain the time-domain combined signals point of the present sampling period, combining the time-domain combined signals point of the present sampling period with the time-domain combined signals points of a number of historical sampling periods to obtain the time-domain signals combination data of the present sampling period.

Exemplarily, the time-domain combined signals point of each sampling period may be stored in a first-in first-out queue with a fixed or adjustable length, for example, the time-domain combined signals points corresponding to the time-domain signals data in the setting time can be stored in the queue. For example, when there are 100 sampling periods in ½ cycle, may set a queue of length Y=100 that can store 100 time-domain combined signals points; the time-domain combined signals point obtained at each sampling period is input to the queue in accordance with the first-in first-out principle, that is, if there are already 100 time-domain combined signals points in the queue, the time-domain combined signals point at the head of the queue will be ejected at the next input, and then a new time-domain combined signals point will be input at the end of the queue. The time-domain combined signals points of multiple sampling periods in the queue can be combined to obtain the time-domain signals combination data. In this way, according to the time-domain signals combination data corresponding to the queue, the machine learning model can identify the fault type corresponding to the time-domain signals combination data and determine whether a fault occurs, then repeat this process to realize continuous identification.

It should be noted that the time-domain signals data of multiple sampling periods are fused based on the preset fusion rules to obtain the time-domain signals combination data, which is not limited to processing the time-domain signals data of each sampling period into the time-domain combined signals point and combining multiple time-domain combined signals points to obtain the time-domain signals combination data. For example, the time-domain signals data of multiple sampling periods can also be fused based on the following data formats to obtain the time-domain signals combination data: the time-domain signals data of the first channel of multiple sampling periods of the target element, the time-domain signals data of the second channel, . . . , time-domain signals data of the nth channel of multiple sampling periods of the target element, where n is the total channel number of time-domain signals data of the target element; such as the phase A current $i_{a1}$, phase B current $i_{b1}$ and phase C current $i_{c1}$ at one terminal of the target element in multiple sampling periods, the phase A current $i_{a2}$, phase B current $i_{b2}$ and phase C current $i_{c2}$ at the other terminal; for example, may set six queues to respectively store the current of a total of six channels of three phases at both terminals of the target element, and the data in the six queues can be processed to obtain the time-domain signals combination data. Also it is not limited to this.

Step S130: Based on a trained machine learning model, determine whether a fault occurs in the target element and a fault type according to the first time-domain signals combination data.

For the future smart grid, it is necessary to formulate countermeasures in advance, revisit the relay protection performance criteria and address the optimization methodologies for power system protection and control. In the cyber-physical power system (CPPS) like the smart grid, power and information flows are highly integrated, the power information system will have access to a plenty of causality data, real-time data, and even high-dimensional spatio-temporal data. This embodiment of the present application can effectively utilize the big data of the cyber-physical power system based on the machine learning model and improve the operation and control performance of the power system. Machine learning algorithm, especially deep learning, have good generalization ability in automatic feature extraction. The ability of machine learning algorithm to obtain feature information from chaotic data is excellent. This embodiment of the present application can produce sensible responses to new inputs never encountered in artificial intelligence training in the field of smart grid based on machine learning models. The machine learning model can show excellent performance in the practical application of such a complex system as smart grid, reflecting certain application value, for example, it has a significant effect in dealing with the fault information with obvious characteristics of the power system.

Referring to FIG. 2, for relay protection device 321 and relay protection device 322 at both terminals of the second transmission line 320, a fault occurs in the first transmission line 310 and the third transmission line 330 is called an external fault, while a fault occurs in the second transmission line 320 is called an internal fault.

The short circuit fault types of three-phase transmission lines include single-phase grounding short circuit, two-phase short circuit, two-phase grounding short circuit and three-phase grounding short circuit. The different short-circuit fault types can be divided into ten internal faults and ten of external faults. The internal faults include; internal A-phase grounding short-circuit INag, internal B-phase grounding short-circuit INbg, internal C-phase grounding short-circuit INcg, internal AB two-phase short circuit INab, internal AC two-phase short circuit INac, internal BC two-phase short circuit INbc, internal AB two-phase grounding short-circuit INabg, internal AC two-phase grounding short-circuit INacg, internal BC two-phase grounding short-circuit INbcg, internal ABC three-phase grounding short circuit INabcg; external faults include: external A-phase grounding short-circuit EXag, external B-phase grounding short-circuit EXbg, external C-phase grounding short-circuit EXcg, external AB two-phase short circuit EXab, external AC two-phase short circuit EXac, external BC two-phase short circuit EXbc, external AB two-phase grounding short-circuit EXabg, external AC two-phase grounding short-circuit EXacg, external BC two-phase grounding short-circuit EXbcg, external ABC three-phase grounding short circuit EXabcg.

Exemplarily, inputting time-domain signals combination data to the trained machine learning model, a predicted fault type of the time-domain signals combination data can be obtained. For example, the predicted fault type of the machine learning model includes: internal faults and external faults of the target element, which may also include non-faulty. For example, for the second transmission line 320, the predicted fault type of the machine learning model may include ten types of internal fault, ten types of external fault, and non-faulty, a total of 21 fault types.

In some implementations, this embodiment of the present application may also includes the training procedure for the machine learning model. Exemplarily, the training procedure for the machine learning model includes step S210 to S230. It can be understood that an embodiment of the present application further provides a training method for the machine learning model for pilot protection.

Step S210: Obtain a training dataset that includes multiple time-domain signals combination data and a marked fault type of each of the multiple time-domain signals combination data.

In some implementations, the time-domain signals data of element can be obtained from the dataset shared by the smart grid. Based on the preset fusion rules, the time-domain signals data can be fused to obtain the time-domain signals combination data. The marked fault type of the time-domain signals combination data can also be determined according to the fault parameters corresponding to the time-domain signals data in the dataset. Also not limited to this, for example, the time-domain signals combination data and corresponding marked fault type in the training dataset can be obtained through model simulation.

In some implementations, fault parameters are set for specific power system elements for the extraction of samples of the time-domain signals combination data in the training dataset.

Exemplarily, obtaining the training dataset includes: setting fault parameters of the target element, the fault parameters including at least one of the following factors: fault distance, fault inception angle, pre-fault power angle, fault resistance and fault type; setting the target element under the fault parameters and obtaining the time-domain signals data of multiple sampling periods of the target element; based on the preset fusion rules, fusing the time-domain signals data of multiple sampling periods to obtain the time-domain signals combination data; according to the fault parameters of the target element, mark time-domain signals combination data as the corresponding fault type.

Exemplarily, there are at least two time-domain signals combination data corresponding to different fault parameters in the training dataset to ensure the integrity and representativeness of sample selection.

Exemplarily, when setting fault parameters of the target element, make the fault parameters may cover all the factors affecting the fault characteristics, such as fault distance, fault inception angle, pre-fault power angle, fault resistance, fault type and other factors. In addition, make the fault parameters may cover the possible distribution range of operation parameters fairly evenly. For example, considering the distribution of the fault inception angle is in the range of 0°-360°, considering the possibility of maximum and minimum values of the fault resistance that may occur in actual operation, and the typical values with physical essential differences may also be considered to cover, for example, the beginning terminal and ending terminal in the fault distance may be involved in the dead zone identification problem. The set fault types may include internal and external faults of the target element, and may also include all types of phase-to-phase faults, all types of grounding faults and non-faulty.

In some implementations, obtain the time-domain signals data, such as three-phase current data, of the target element of one cycle before and after a fault occurs, and the fault can be determined according to the fault parameters. For example, FIG. 3(a) to 3(f) show signal waveforms of the current $i_{a1}$, $i_{b1}$, $i_{c1}$, $i_{a2}$, $i_{b2}$ and $i_{c2}$ at both terminals of the second transmission line 320 when an internal fault A-phase grounding short circuit (INag) occurs at t=0.2 s.

Exemplarily, the time-domain signals data of multiple sampling periods can be obtained from the time-domain signals data of the target element of one cycle before and after a fault occurs; based on the preset fusion rules, the time-domain signals data of multiple sampling periods are fused to obtain the time-domain signals combination data. For example, the time-domain signals data of multiple sampling periods is the time-domain signals data in the setting time (e.g., ¼ cycle, ½ cycle, 1 cycle), the time-domain signals combination data obtained by fusing the time-domain signals data in the setting time can be called the combination data sample.

In some implementations, white noise with preset signals-to-noise ratio (SNR) and harmonics with preset content may be added to the obtained time-domain signals data, so that the trained machine learning model can accurately identify the fault type when responding to white noise and harmonics.

Exemplarily, by changing the fault parameters (e.g., fault distance, fault inception angle, pre-fault power angle, fault resistance, fault type, etc.) to obtain time-domain signals data of the target element under different fault parameters, so that the time-domain signals combination data obtained by fusing is also corresponding to different fault parameters. For example, may collect multiple combination data samples, each combination data sample is obtained by fusing time-domain signals data (e.g., time-domain signals data in ½ cycle), and the set of these combination data samples can be denoted as the training dataset. Then, may reset the parameters of the second source 120, and a random set of combination data samples may be obtained by randomly setting the above fault parameters, the set of these combination data samples can be denoted as the test dataset, so that two datasets containing different combination data samples can be obtained.

Figure 4:
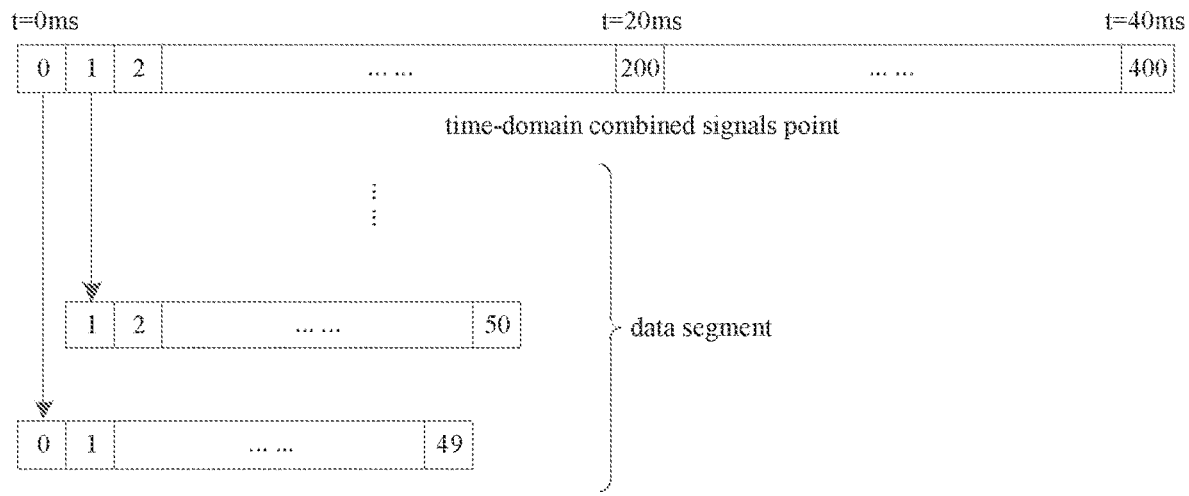
FIG. 4 is a schematic diagram of the process for obtaining the training dataset in one implementation of the present application.

Exemplarily, referring to FIG. 4, when a fault occurs at t=20 ms, take the time-domain signals data of one cycle before and after the fault, and organize the time-domain signals data of each sampling period in the preset format to obtain {0, 1, 2, . . . , 399}, a total of 400 time-domain combined signals points. Each time-domain combined signals point corresponds to the time-domain signals data of a sampling period, for example, current signal data of a sampling period, such as $i_{a1}$-$i_{b1}$-$i_{c1}$-$i_{a2}$-$i_{b2}$-$i_{c2}$; for example, the time-domain combined signals point 0 represents the time-domain signals data (e.g., current signals $i_{a1}$-$i_{b1}$-$i_{c1}$-$i_{a2}$-$i_{b2}$-$i_{c2}$) at t=0 ms.

Exemplarily, the time-domain combined signals points of one cycle before and after the fault can be segmented according to the setting time, and the obtained data segment can be used as time-domain signals combination data, that is combination data sample.

For example, as shown in FIG. 4, the time-domain combined signals point 0 (the first time-domain combined signals point) is taken as the beginning data point for segmentation and the time-domain combined signals point 49 is taken as the ending data point for segmentation to obtain the data segment that including 50 time-domain combined signals points, so that the first time-domain signals combination data is obtained. Then select the second, third, and fourth . . . time-domain combined signals point as the beginning data point for segmentation to obtain the second, third, and fourth . . . time-domain signals combination data, until the time-domain combined signals points of one cycle before and after the fault are all divided. Also not limited to this, for example, the interval may also be selected (e.g., equal interval, unequal interval) when selecting the beginning data point. Optionally, the interval may be selected, such as 1-10 points, generally within 5 points, and the interval is relatively uniform. The preferred selection method is sequential selection or equally interval selection, for example, a training dataset and a test dataset can be segmented in different ways, or the same way, for example, for the test dataset, the beginning data point of the first segment is the first time-domain combined signals point, and the beginning data point of each segment is the next time-domain combined signals point of the last beginning data point; for the training dataset, the beginning data point can be selected without such strict selection, for example, the starting data points can be selected in an interval (e.g., an fairly evenly interval between every two beginning data points).

For example, as shown in FIG. 4, according to a set identification window size (e.g., 50 time-domain combined signals points), to intercept and segment 400 time-domain combined signals points. By sliding the identification window, multiple data segments are obtained from the 400 time-domain combined signals points, so that multiple combination data samples are obtained.

In some implementations, in the training dataset and test dataset, when at least one time-domain signals data sampling period in the time-domain signals data of multiple sampling periods in the fusion of time-domain signals combination data is the sampling period after a fault occurs, and the number of the time-domain signals data sampling period after a fault occurs is greater than or equal to preset fault threshold, regard this time-domain signals combination data as faulty and mark this time-domain signals combination data as the corresponding fault type. When S or more than S time-domain combination signals points in the fusion of the time-domain signals combination data are the time-domain combination signals points after a fault occurs, mark this time-domain signals combination data as the corresponding fault type (e.g., an internal fault type, an external fault type, etc.). Exemplarily, when at least one time-domain signals data sampling period in the time-domain signals data of multiple sampling periods in the fusion of time-domain signals combination data is the sampling period after a fault occurs, and the number of the time-domain signals data sampling period after a fault occurs is less than the preset fault threshold, regard this time-domain signals combination data as non-faulty and mark this time-domain signals combination data as non-faulty. Thus, the sensitivity of the machine learning model to faults can be adjusted by setting the preset fault threshold, which can be called the fault sensitive point threshold.

Exemplarily, the preset fault threshold S may be from one-twentieth to one-fifth of the total number of sampling periods per fundamental frequency period, for example, the preset fault threshold S may be one-tenth of the total number of sampling periods per fundamental frequency period. Also not limited to this, for example, the preset fault threshold S may be 1 or 2 or 3 or 4.

Exemplarily, in the combination data samples of the training dataset, there are at least one of the combination data samples only includes the time-domain combined signals points obtained by fusing time-domain signals data in multiple sampling periods before a fault occurs, and at least one of the combination data samples only includes the time-domain combined signals points obtained by fusing time-domain signals data in multiple sampling periods after a fault occurs, and at least one of the combination data samples includes time-domain combined signals points obtained by fusing time-domain signals data in multiple sampling periods before a fault occurs and after the fault occurs. Optionally, may include the combination data sample that comprising time-domain combined signals points obtained by fusing the time-domain signals data in multiple sampling periods before a fault occurs and after the fault occurs, may also include time-domain combined signals points obtained by fusing the time-domain signals data in multiple sampling periods after a fault occurs, and/or time-domain combined signals points obtained by fusing the time-domain signals data in multiple sampling periods after a fault occurs.

When a fault occurs at t=20 ms, take the time-domain signals data of one cycle before and after the fault occurs, and organize the time-domain signals data of each sampling period in the preset format to obtain $\{0, 1, 2, \ldots, 399\}$ that a total of 400 time-domain combined signals points. Each time-domain combined signals point corresponds to the time-domain signals data of a sampling period, such as the current signal data of the sampling period like $i_{a1}$-$i_{b1}$-$i_{c1}$-$i_{a2}$-$i_{b2}$-$i_{c2}$; for example, the time-domain combined signals point 0 represents the time-domain signals data (e.g., the current signals $i_{a1}$-$i_{b1}$-$i_{c1}$-$i_{a2}$-$i_{b2}$-$i_{c2}$) at t=0 ms.

Step S220. Input each of the multiple time-domain signals combination data to a machine learning model to obtain a predicted fault type of each of the multiple time-domain signals combination data.

Exemplarily, the time sequence of time-domain signals combination data can be set according to the time sequence of the time-domain signals data that is a fusion part of this time-domain signals combination data. For example, referring to FIG. 4, mark the time-domain signals combination data obtained by combining the time-domain combined signals points $\{0, 1, \ldots, 49\}$ as time sequence [0], and mark the time-domain signals combination data obtained by combining the time-domain combined signals points $\{1, 2, \ldots, 50\}$ as time sequence [1]. Also not limited to this, for example, the time sequence of time-domain signals combination data can be set according to the time sequence of the first or last time-domain combined signals point in the data segment, it can also be set according to other methods to ensure that the sequence of corresponding data segments is unchanged.

In some implementations, the machine learning model is the artificial intelligence model, such as a convolutional neural network (CNN) model, also not limited to this, for example, it may also be an extreme learning machine (ELM) model, a residual neural network (ResNet) model and other artificial intelligence models.

In some implementations, the machine learning model is based on the convolutional neural network to identify faults according to the input time-domain signals combination data. For example, the following fault types can be identified: non-faulty, internal and external faults respectively including: A-phase grounding short circuit, B-phase grounding short circuit, C-phase grounding short circuit, AB two-phase short circuit, AC two-phase short circuit, BC two-phase short circuit, AB two-phase grounding short circuit, AC two-phase grounding short circuit, BC two-phase grounding short circuit, ABC three-phase short circuit, a total of 21 fault types.

Step S230: According to the marked fault type and the predicted fault type corresponding to each of the multiple time-domain signals combination data, adjust machine learning model parameters to obtain a trained machine learning model.

Exemplarily, determine one or more of the performance indices (e.g., loss value, accuracy, etc.) of the machine learning model according to the deviations between the marked fault type and the predicted fault type corresponding to each of the multiple time-domain signals combination data, and adjust machine learning model parameters according to the performance indices to train the machine learning model. In some implementations, adjust the structure of the machine learning model according to the performance indices.

Exemplarily, input a portion of the multiple time-domain signals combination data to the machine learning model been trained, and the machine learning model been trained can be validated and tested to obtain a machine learning model that is optimal or achieves convergence for the power system element (i.e., a trained machine learning model). The trained machine learning model can be run online to determine whether a fault occurs in the target element in real-time.

Step S140: When it is determined that a fault occurs in the target element according to the first time-domain signals combination data, based on the trained machine learning model, determine whether a fault occurs in the target element in the second sampling period and the fault type according to the second time-domain signals combination data.

Exemplarily, when the target element is determined to be non-faulty according to the first time-domain signals combination data, the present sampling period is used as the first sampling period, continually collect the time-domain signals data of the first sampling period, and fuse the time-domain signals data of multiple first sampling periods, to determine whether a fault occurs in the target element according to the obtained first time-domain signals combination data.

Exemplarily, based on the trained machine learning model, at the moment that it is determined a fault occurs in the target element according to the first time-domain signals combination data, instead of controlling the pilot protection system to perform the protection action on the target element at first, continually collect the time-domain signals data of subsequent second sampling periods, and determine whether a fault occurs in the target element in the second sampling period. For example, the pilot protection system may comprises an electromechanical protection device.

Specifically, the second sampling period is the sampling period after determining that a fault occurs in the target element, the second time-domain signals combination data is obtained by fusing the time-domain signals data of the first sampling periods and at least one of the second sampling periods, or by fusing the time-domain signals data of multiple second sampling periods.

The inventors of this present application discovered that when a fault occurs in a system, whether internal or external fault, identification accuracy of the machine learning model, such as the convolutional neural network, decreases and fluctuates for a period of time after the fault occurs, when the identification accuracy of the convolutional neural network fails to meet the requirements, and this period of time is referred to as a fuzzy section. In response to this discovery, the inventors have improved the pilot protection method, specifically, when it is that determined a fault occurs in the target element according to the first time-domain signals combination data, based on the trained machine learning model, determine whether a fault occurs in the target element in the second sampling period according to the second time-domain signals combination data.

In some implementations, when it is determined that a fault occurs in the target element according to the first time-domain signals combination data, after a preset duration, based on the trained machine learning model, determine whether a fault occurs in the target element in the second sampling period and the fault type according to the second time-domain signals combination data, wherein, the second sampling period is the sampling period after the preset duration, the second time-domain signals combination data is obtained by fusing the time-domain signals data of multiple first sampling periods, all sampling periods in the preset duration and at least one of the second sampling periods, or by fusing the time-domain signals data of at least some of the sampling periods within the preset duration and at least one of the second sampling periods, or by fusing the time-domain signals data of multiple second sampling periods.

Exemplarily, after passing through the fuzzy section following a fault occurs, the identification accuracy of the machine learning model, such as the convolutional neural network, rises back up to near 100% and the identification accuracy is back up to meet the requirement, and this period of time is referred to as a stability section. After the preset duration following a fault occurs, the identification accuracy is sufficiently high to determine whether a fault occurs in the target element in the second sampling period and the fault type according to the second time-domain signals combination data.

Exemplarily, the preset duration ranges from one-eighth to one of the fundamental frequency period. Optionally, the preset duration ranges from one-eighth to three-fourths of the fundamental frequency period (e.g., ⅙ cycle, ¼ cycle, ½ cycle, ¾ cycle of the fundamental frequency period). For example, the preset duration may be a fixed value or a different value chosen according to the requirements of the specific system.

It needs to be noted that, within the preset duration following a fault occurs in the target element, the time-domain signals data can still be collected in real-time, and the time-domain signals data can be fused at least, and the time-domain signals combination data obtained by fusing can also be predicted based on the trained machine learning model. In addition, it may also be possible not to predict the time-domain signals combination data obtained by fusing within the preset duration, but after the preset duration, to determine whether a fault occurs in the target element in the second sampling period according to the second time-domain signals combination data. This is not limited in this embodiment of the present application.

Step S150: When it is determined that the same type of fault occurs in the target element in multiple consecutive second sampling periods, the pilot protection system is controlled to perform the protection action on the target element according to the fault type.

Exemplarily, after the preset duration following determining that a fault occurs in the target element, if it is determined that the same type of fault occurs in the target element in multiple consecutive second sampling periods, the pilot protection system is controlled to perform protection action on the target element according to the fault type. Performing the protection action on the target element after determining that the same type of fault occurs in the target element in multiple consecutive second sampling periods can prevent protection malfunctions.

Exemplarily, when it is determined that the same type of fault occurs in the target element in multiple consecutive second sampling periods, and the number of the multiple consecutive second sampling periods is greater than or equal to the preset protection threshold, regard the determination result is credible. According to the fault type, the pilot protection system can be controlled to perform the protection action on the target element. For example, the preset protection threshold C may be, but is not limited to, 10, a fixed value, or a different value chosen according to the requirements of the specific system.

In some implementations, the method may also include: when it is determined a fault occurs in the target element according to the first time-domain signals combination data, the pilot protection system of the target element is controlled to start so that the pilot protection system can trips when the pilot protection system receive tripping instruction. When it is determined a fault occurs in the target element according to the first time-domain signals combination data, there is a great possibility that the pilot protection system required to trip, so controlling the pilot protection system of the target element to start when it is determined that a fault occurs in the target element according to the first time-domain signals combination data. In this way, it is convenient for the pilot protection system to trip quickly and reliably when it is determined that the same type of internal fault occurs in the target element in multiple consecutive second sampling periods.

Exemplarily, when it is determined that the same type of fault occurs in the target element in multiple consecutive second sampling periods, the pilot protection system is controlled to perform the protection action on the target element according to the fault type, including: when it is determined that the same type of internal fault occurs in the target element in multiple consecutive second sampling periods, sent the tripping instruction to the pilot protection system to trip.

For example, when the trained and optimized machine learning model runs online, the pilot protection system will not be triggered to start when the target element is determined to be non-faulty; the pilot protection is started when it is determined that any type of fault occurs in the target element.

Exemplarily, when it is determined that a fault occurs in the target element according to the first time-domain signals combination data, control the pilot protection system of the target element to start but not trigger the pilot protection system to trip at first. After passing through the fuzzy section of the machine learning model and entering into the stable section where the identification accuracy of the machine learning model is close to or equal to 100%, trigger the pilot protection system to trip only when it is determined that the same type of internal fault occurs in the target element in multiple consecutive second sampling periods, so that the pilot protection system can be accurately and quickly controlled to perform the protection action on the target element.

Exemplarily, according to the set fuzzy section window, after the preset duration that following determining that a fault occurs in the target element, such as set the fuzzy section window as 5 ms, that after starting the pilot protection system 5 ms, if it is determined that the same type of internal fault occurs in the target element in continuous C points (sampling periods), send the tripping instruction to control pilot protection system tripping. By setting the fuzzy section window, it can avoid the protection malfunctions caused by the reduced identification accuracy and stability of the machine learning model that fails to meet the expectation in a period of time after the fault occurs.

In some implementations, when it is determined that a fault occurs in the target element according to the first time-domain signals combination data, after the preset duration, based on the trained machine learning model, determine whether a fault occurs in the target element in the second sampling period and the fault type according to the second time-domain signals combination data. The value of the preset duration can be determined according to the performance indices of the machine learning model.

Exemplarily, the method may also include: obtaining a test dataset that includes multiple time-domain signals combination data and the marked fault type of each of the multiple time-domain signals combination data; inputting each of the multiple time-domain signals combination data to the machine learning model to obtain the predicted fault type of each of the multiple time-domain signals combination data; the performance indices of the machine learning model are determined according to the marked fault type and the predicted fault type corresponding to each of the multiple time-domain signals combination data; the value of the preset duration is determined according to the performance indices of the machine learning model.

Exemplarily, performance indices of the machine learning model include identification accuracy, stability, etc.; for example, the value of the preset duration is negatively correlated with the identification accuracy of the predicted results of the machine learning model, if having the higher the identification accuracy, the smaller the value of the preset duration can be. The preset duration (i.e., the length of the fuzzy section) mainly depends on the identification accuracy of the machine learning model and other indices as well as the performance of the communication system. In general, the shorter length of the fuzzy section and the higher the identification accuracy and stability in the stable section is desired.

In some implementations, determining performance indices of the machine learning model according to the marked fault type and the predicted fault type corresponding to each of the multiple time-domain signals combination data, include: determining the performance indices of the machine learning model corresponding to each of the multiple time-domain signals combination data according to the marked fault type and the predicted fault type corresponding to each of the multiple time-domain signals combination data; determining the value of preset duration according to the performance indices of the machine learning model, include: based on the time sequence of multiple time-domain signals combination data, determining a change trend of performance indices of the machine learning model according to the performance indices corresponding to each of the multiple time-domain signals combination data; determining the value of the preset duration according to the change trend of the performance indices.

Exemplarily, input each time-domain signals combination data in the test dataset into the trained machine learning model, and determine the identification accuracy and other performance indices of the machine learning model corresponding to each time-domain signals combination data according to the marked fault type and the predicted fault type; and according to the time sequence of multiple time-domain signals data in the test dataset, determine the change trend of the performance indices of the machine learning model. For example, each time-domain signals combination data in the test dataset is added with a time sequence mark, the identification accuracy and other performance indices corresponding to each time-domain signals combination data are arranged according to the time sequence marks, to obtain the change trend of performance indices of the machine learning model, or can be called as online performance. Alternatively, multiple time-domain signals combination data in the test dataset can be sequentially input to the machine learning model, so that the corresponding identification accuracy and other performance indices can be sequentially determined, it can be understood that the time sequence marks can be removed from time-domain signals combination data in this way.

Figure 5A:
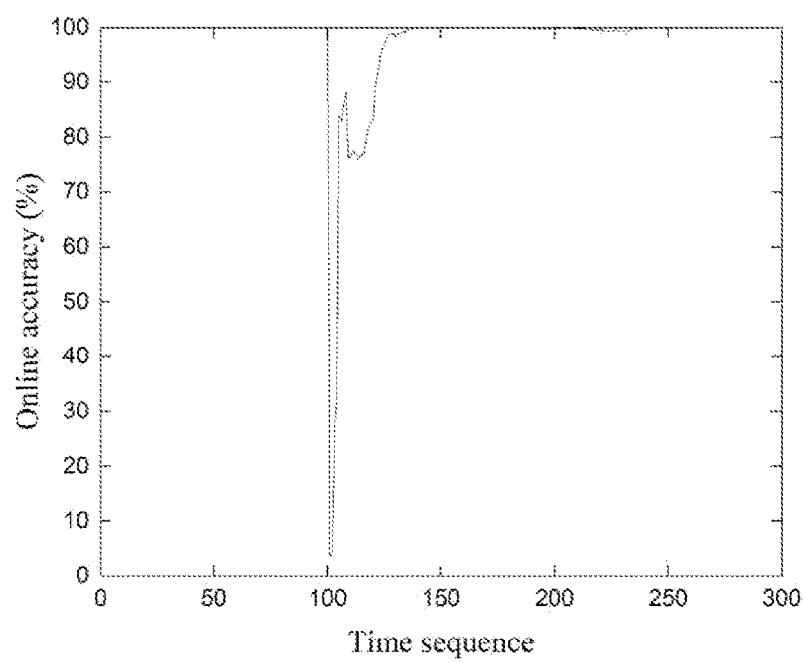
FIG. 5(a) to 5(c) are schematic diagrams of the performance indices trend of the machine learning model in one implementation of the present application.
Figure 5B:
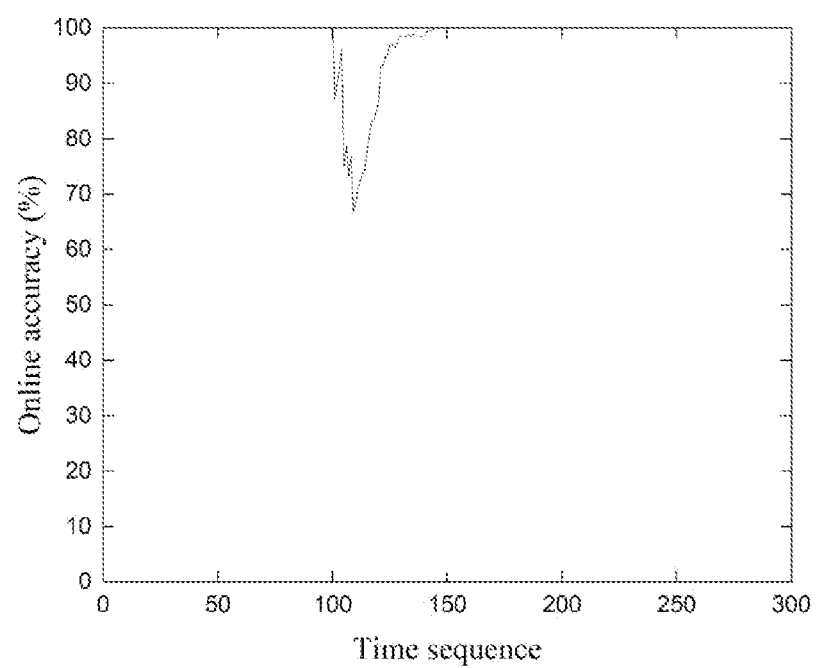
Figure 5C:
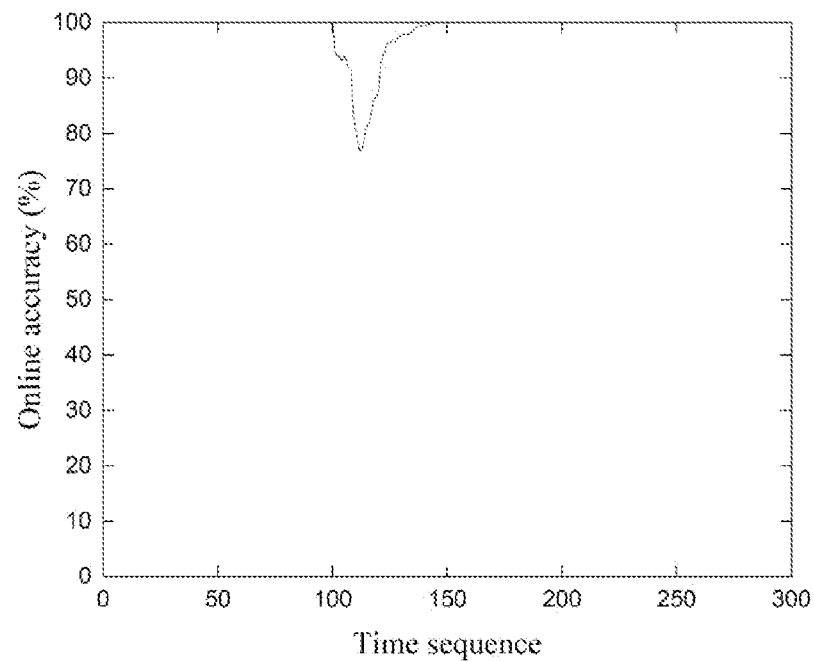

In some implementations, referring to FIG. 2 and FIG. 5, as shown in FIG. 5(a), a change curve of identification accuracy of the machine learning model for fault identification (i.e. a change trend of online accuracy) according to the time-domain signals combination data obtained by fusing the time-domain signals data of each terminal of the second transmission line 320 at each moment before and after an external fault occurs in the first transmission line 310; as shown in FIG. 5(b), a change trend of identification accuracy of the machine learning model for fault identification according to the time-domain signals combination data obtained by fusing the time-domain signals data of each terminal of the second transmission line 320 when an internal fault occurs in the second transmission line 320; as shown in FIG. 5(c), a change trend of identification accuracy of the machine learning model for fault identification according to the time-domain signals combination data obtained by fusing the time-domain signals data of each terminal of the second transmission line 320 when an external fault occurs in the third transmission line 330. Referring to FIGS. 5(a) to 5(c), identification accuracy of the machine learning model that based on the convolutional neural network is 100% when the power system model is operating normally and non-faulty, while a fault occurs, the identification accuracy of the convolutional neural network decreases in the fuzzy section, and if control to trip when in the fuzzy section that can lead to malfunctions of the protection device. Referring to FIG. 5(a) to FIG. 5(c), the value of the preset duration can be determined according to the width of the trough of the change curve of identification accuracy of the machine learning model after a fault occurs.

In some implementations, when testing the convolutional neural network, the convolutional neural network can be judged to be a trained machine learning model when the identification accuracy of the convolutional neural network before a fault occurs is 100% and all enter into the stability section after passing through the fuzzy section. For example, when the convolutional neural network can accurately determine the fault type, it can be used as a trained machine learning model.

In some implementations, the convolutional neural network identifies fixed length data for each input, and the convolutional neural network sends the instruction to start the protection when it determines a fault occurs, which puts the protection in a ready state, but does not send the tripping instruction. The protection will not send a tripping instruction until passing the fuzzy section and the convolutional neural network determines that the same type of fault occurs in all the consecutive C (C>0) points. This scheme can greatly reduce the probability of protection malfunction.

The pilot protection method provided by this embodiment of the present application, obtaining the time-domain signals data of the target element at a preset sampling frequency; fusing time-domain signals data of multiple first sampling periods based on the preset fusion rules to obtain the first time-domain signals combination data; based on the trained machine learning model, determining whether a fault occurs in the target element and the fault type according to the first time-domain signals combination data; when it is determined that a fault occurs in the target element according to the first time-domain signals combination data, based on the trained machine learning model, determining whether a fault occurs in the target element in the second sampling periods and the fault type according to the second time-domain signals combination data, the second sampling period is the sampling period after determining a fault occurs in the target element; and when it is determined that the same type of fault occurs in the target element in multiple consecutive second sampling periods, controlling the pilot protection system to perform the protection action on the target element according to the fault type. The machine learning model can be used to realize fault identification of power system elements and timely, accurately and reliably remove the faulty elements, so as to significantly improve the protection performance of the smart grid.

In some implementations, pilot protection scheme of this embodiment of the present application has advantages over conventional protection schemes, it can provide faster protection speed and rather high action precision without dead zones, wiring limitations, or complex frequency domain criteria and rectification calculation requirements, and good adaptability to harmonics, fault resistance and current transformer saturation.

Figure 6:
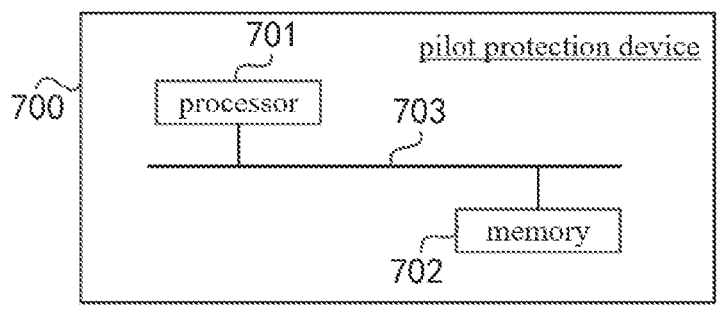
FIG. 6 is a schematic block diagram of a pilot protection device according to an embodiment of the present application.

Referring to FIG. 6, FIG. 6 is a schematic block diagram of a pilot protection device 700 according to an embodiment of the present application. Optionally, the pilot protection device 700 can be applicable to the above performance evaluation method.

As shown in FIG. 6, pilot protection device 700 includes one or more processors 701, and the one or more processors 701 work individually or together to perform the steps of the above performance evaluation method.

Exemplarily, the pilot protection device 700 also includes memory 702.

Exemplarily, the processor 701 and memory 702 are connected through the bus 703 (e.g., an Inter-Integrated Circuit (I2C) bus)

Specifically, the processor 701 may be a micro-controller unit (MCU), a central processing unit (CPU) or a digital signals processor (DSP), etc.

Specifically, the memory 702 may be a flash chip, a read-only memory (ROM), a CD-ROM, a usb flash drive, or a portable hard drive, etc.

Wherein, the processor 701 is used to execute the computer programs stored in the memory 702 and to perform the steps of the above performance evaluation method while executing the computer program.

Exemplarily, the processor 701 is used to execute the computer programs stored in the memory 702 and perform the following steps while executing the computer programs:

Obtain time-domain signals data of a target element at a preset sampling frequency;

Based on preset fusion rules, fuse time-domain signals data of multiple first sampling periods to obtain first time-domain signals combination data.

Based on a trained machine learning model, determine whether a fault occurs in the target element and a fault type according to the first time-domain signals combination data;

When it is determined that a fault occurs in the target element according to the first time-domain signals combination data, based on the trained machine learning model, determine whether a fault occurs in the target element in the second sampling period and the fault type according to the second time-domain signals combination data, the second sampling period is the sampling period after determining that a fault occurs in the target element. The second time-domain signals combination data is obtained by fusing the time-domain signals data of the first sampling periods and at least one of the second sampling periods, or by fusing the time-domain signals data of multiple second sampling periods.

When it is determined that the same type of fault occurs in the target element in multiple consecutive second sampling periods, the pilot protection system is controlled to perform the protection action on the target element according to the fault type.

The specific principles and implementations of the pilot protection device according to this embodiment of the present application are similar to the performance evaluation method in the above embodiments and will not be described here.

An embodiment of the present application further provides a computer-readable storage medium, the computer-readable storage medium storing computer programs, the computer program including program instructions, the processor performs the steps of the performance evaluation method in the above embodiment when executing the computer program.

Wherein, the computer-readable storage medium may be an internal storage unit of the pilot protection device in any of the above embodiments (e.g., a hard disk of the pilot protection device, a memory of the pilot protection device). The computer-readable storage medium may also be an external storage device of the pilot protection device, such as a plug-in hard disk, a smart media card (SMC), a secure digital (SD) card, and a flash card equipped on the pilot protection device.

It should be understood that the terms used herein in the present application are used solely for the purpose of describing particular embodiments and are not intended to limit the present application.

It should also be understood that the term "and/or" as used in the present application and appended claims refers to any and all possible combinations of one or more of the items listed in connection therewith, and includes such combinations.

It should be noted that the descriptions in the present application involving "first", "second", etc. are for descriptive purposes only and are not to be construed as indicating or implying their relative importance or implicitly specifying the number of technical features indicated. Thus, the features qualified with "first" and "second" may explicitly or implicitly include at least one such feature.

The above description is merely illustrative of the embodiments of the present application and is not intended to limit the scope of protection of the present application. It will be understood by those skilled in the art that various modifications and variations may be made to the present disclosure. Any modifications, equivalent alternatives, improvements and so on made within the spirit and principle of the present application are intended to be encompassed within the scope of protection of the present application. Therefore, the protection scope of the present application should be denied by protection scope of the claims.

What is claimed is:

1. A pilot protection method, comprising:
    obtaining time-domain signals data of a target element at a preset sampling frequency;
    fusing time-domain signals data of multiple first sampling periods to obtain first time-domain signals combination data based on preset fusion rules;
    determining whether a fault occurs in the target element and a fault type according to the first time-domain signals combination data based on a trained machine learning model;
    when it is determined that a fault occurs in the target element according to the first time-domain signals combination data, after a preset duration, based on the trained machine learning model, determining whether a fault occurs in the target element in the second sampling period and the fault type according to the second time-domain signals combination data, and the second sampling period is the sampling period after the preset duration, the second time-domain signals combination data is obtained by fusing the time-domain signals data of multiple first sampling periods, all sampling periods in the preset duration and at least one of the second sampling periods, or by fusing the time-domain signals data of at least some of the sampling periods within the preset duration and at least one of the second sampling periods, or by fusing the time-domain signals data of multiple second sampling periods; wherein the preset duration is determined according to a change trend of the performance indices of the trained machine learning model; and
    when it is determined that the same type of fault occurs in the target element in multiple consecutive second sampling periods, the pilot protection system is controlled to perform the protection action on the target element according to the fault type.

2. The pilot protection method according to claim 1, comprising:
    when it is determined that a fault occurs in the target element according to the first time-domain signals combination data, the pilot protection of target element is controlled to start to let the pilot protection system trip when receiving tripping instruction;
    when it is determined that the same type of fault occurs in the target element in multiple consecutive second sampling periods, the pilot protection system is controlled to perform the protection action on the target element according to the fault type, includes:
    when it is determined that the same type of internal fault occurs in the target element in multiple consecutive second sampling periods, the tripping instruction is sent to the pilot protection system to make the pilot protection system trip.

3. The pilot protection method according to claim 1, wherein before determining whether a fault occurs in the target element and the fault type according to the first time-domain signals combination data based on the trained machine learning model, the method further includes:
    obtaining a test dataset, the test dataset including multiple time-domain signals combination data and a marked fault type of each of the multiple time-domain signals combination data;
    inputting each of the multiple time-domain signals combination data to the trained machine learning model to obtain a predicted fault type of each of the multiple time-domain signals combination data;

determining performance indices of the trained machine learning model corresponding to each of the multiple time-domain signals combination data according to the marked fault type and the predicted fault type corresponding to each of the multiple time-domain signals combination data;

determining a change trend of the performance indices of the trained machine learning model according to the performance indices corresponding to each of multiple time-domain signals combination data based on the time sequence of multiple time-domain signals combination data; and determining a value of the preset duration according to the change trend of the performance indices.

4. The pilot protection method according to claim 3, wherein the preset duration range is: from one-eighth to one of the fundamental frequency period.

5. The pilot protection method according to claim 1, wherein before determining whether a fault occurs in the target element and the fault type according to the first time-domain signals combination data based on the trained machine learning model, the method further includes:

obtaining a training dataset, the training dataset including multiple time-domain signals combination data and a marked fault type of each of the multiple time-domain signals combination data;

inputting each of the multiple time-domain signals combination data to a machine learning model to obtain a predicted fault type of each of the multiple time-domain signals combination data;

adjusting machine learning model parameters according to the marked fault type and the predicted fault type corresponding to each of the multiple time-domain signals combination data to obtain a trained machine learning model.

6. The pilot protection model according to claim 5, wherein obtaining the training dataset, includes:

determining target element fault parameters, the target element fault parameters including at least one of the following: fault distance, fault inception angle, pre-fault power angle, fault resistance and fault type;

obtaining time-domain signals data of the target element of multiple sampling periods based on the target element under the fault parameter;

fusing time-domain signals data of multiple sampling periods based on preset fusion rules to obtain time-domain signals combination data;

marking the time-domain signals combination data as the corresponding fault type according to the fault parameters of the target element.

7. A pilot protection device, comprising a memory and a processor;

the memory being configured for storing computer programs;

the processor being configured for executing the computer programs, and performing the steps of the pilot protection method as claimed in claim 1 when executing the computer programs.

8. A power system, comprising:

a first source and a second source;

a first bus, a second bus, a third bus, a fourth bus arranged between the first source and the second source at intervals;

a first transmission line between the first bus and the second bus, a second transmission line between the second bus and the third bus, a third transmission line between the third bus and the fourth bus;

relay protection devices which are set at terminals on opposite sides of each of the first transmission line, the second transmission line and the third transmission line; and a pilot protection device, comprising a memory and a processor, the memory being configured for storing computer programs, the processor being configured for executing the computer programs, and performing the steps of the pilot protection method as claimed in claim 1 when executing the computer programs, wherein the target element is selected from first transmission line, the second transmission line and the third transmission line.

9. The power system according to claim 8, wherein the time-domain signals data comprises three-phase voltage time-domain signal, and additional signals derived from mathematical operations on voltage and current.

10. The power system according to claim 9, wherein the time-domain signals data comprises three-phase current fault component.

11. The power system according to claim 8, wherein the first time-domain signals combination data of the present sampling period is obtained by combining a time-domain combined signals point of the present sampling period with a time-domain combined signals points of a number of historical sampling periods, and data points of multiple channels obtained in the same sampling period are stored as one-dimensional vector or two-dimensional matrix in the preset order to obtain the time-domain combined signals point.

* * * * *